Sept. 27, 1932.  G. ELWERT  1,880,124
NUT LOCK
Filed April 17, 1929

Witness:-
Robert Thompson Sloan

Inventor:
George Elwert.

Patented Sept. 27, 1932

1,880,124

UNITED STATES PATENT OFFICE

GEORGE ELWERT, OF BARREN HILL, PENNSYLVANIA

NUT LOCK

Application filed April 17, 1929. Serial No. 355,876.

This invention relates to an improved nut lock which can be adapted for use in connection with nuts of all sizes and shapes, the construction and arrangement of the nut lock being such that it may be adapted for use wherever the need is required.

Another purpose is to provide, in a nut lock a simple construction, and one which can be manufactured for relatively low cost and sold at a reasonable profit.

Still another purpose is to provide a nut locking device, which is positive in its locking action against accidental displacement or removal, but may be disassembled by manually removing a locking element.

A further purpose is to provide a nut lock including a lock washer for mounting on a threaded element with means to prevent the washer from turning, in conjunction with a nut engaging the threads of the threaded element, in conjunction with means cooperative with the lock washer and the nut, to prevent accidental removal or displacement of the nut, though it may be manually removed.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
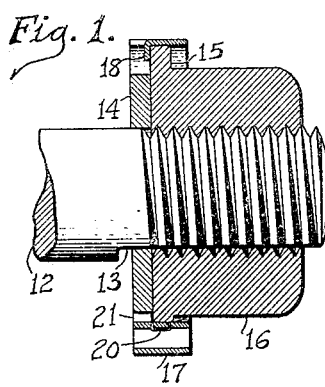
Figure 1 is a sectional view through a lock washer and an adjacent nut, both mounted upon a threaded element, illustrating means to prevent the lock washer from turning, and means cooperatively engaging the lock washer and the nut, to prevent accidental rotation of the nut.

Referring to the drawing, 12 identifies the end of a bolt or threaded element, which may be any size in length and diameter, and may be used for fastening or bolting any two or more objects together.

This threaded element 12 has a flattened face 13, which may be of a length greater than the threaded portion of the element 12.

Figure 5:
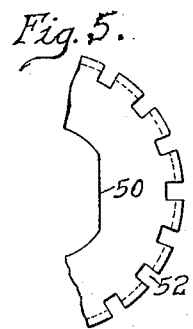
Figure 5 is a face view of the lock washer shown in Figure 1.

Mounted upon the bolt or element 12 is a lock washer 14, the margin of which is provided with a plurality of notches 14a. This lock washer as shown in Figure 5 is provided with a flattened face or edge 14b such as will engage with the flattened surface 13, thereby preventing the lock washer from rotating relative to the bolt or threaded element.

A nut 16 engages with the threads 12a on the bolt or element 12. These threads can be any pitch and any number to the inch, it being a matter of expedience.

The nut can be any size and of any conventional shape or design, in the present instance preferably hexagon. However the nut 16 adjacent one face thereof is provided with a marginal flange 15, which is provided with a plurality of notches 19. Without any obvious reason, excepting as a matter of choice, so as to procure a much finer adjustment of the nut relative to the lock washer, the lock washer is provided with a greater number of notches than the flange of the nut. In other words the lock washer has nineteen notches while the flange of the nut has eighteen notches, which will permit the nut to have a much finer adjustment relative to the washer. However the notches can be equal in number, or a greater quantity on the nut than on the washer. By having a greater number on one than on the other it permits an opportunity to adjust the nut in a greater locked position, and in doing so enables the operator to lock two registering notches much easier than when there are equal number of notches used, consistent with the final adjustment of the nut.

Figure 2:
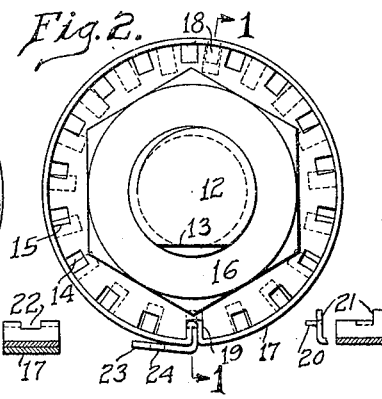
Figure 2 is a view in elevation of the nut locking device shown in Figure 1, illustrating the hexagon nut, there being grouped under the heading of Figure 2, minor details of parts of the locking device.
Figure 3:
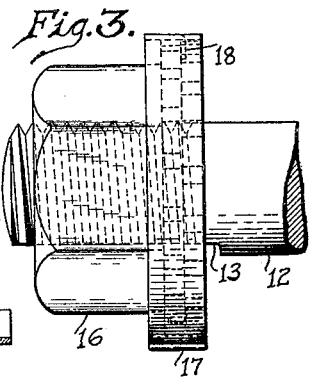
Figure 3 is a view in elevation of the nut locking device viewed from the side opposite that in Figure 1.

Engaged around the margin of the lock washer and the flange is a band 17, which, prior to being applied in position, is normally open. One end portion of this band is bent on itself at 17a, and the portion 23 beyond said bend is turned outwardly and laterally and is provided with an opening 24, which may or may not receive a tool for the purpose of removing the band.

Where the end portion of the band is bent upon itself, it is provided with a notch 22, as illustrated in the minor detail in the lower left hand portion of Figure 2. The other end of the band 17 (which is preferably made of spring steel, though it may be made of any metal having sufficient yieldability) is bent radially inwardly and said inwardly bent portion has a lateral tongue 20 and an extension radial tongue 21. The tongue 20 engages the notch 22, while the tongue 21 engages one of the notches 14a, whereas one of the projections caused to be formed by the notch 22 engages adjacent one side of the flange 15. At a point diametrically opposite where one end of the band is bent upon itself the band is provided with a lug 18, which engages one of the notches 14a of the lock washer. The tongue 21 and the lateral tongue 20 together with a bent part 17a and the lug 18 act to prevent movement of the nut relative to the lock washer while the flattened face 13 prevents movement of the lock washer relative to the bolt.

Figure 4:
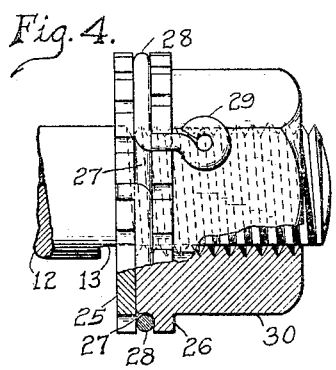
Figure 4 is a view in side elevation of a nut locking device, showing parts thereof in section.

In Figure 4 the nut locking device is slightly modified to the extent that the flange 26 on the nut 30 is offset from one face of the nut, so that when the nut is applied adjacent the lock washer a groove 27 is caused to be formed for the reception of the open spring ring 28. One end 28a of this spring ring engages one of the notches 25a of the lock washer 25 while the other end 28b of the spring ring engages one of the notches 26a of the flange 26, thereby locking the nut relative to the lock washer, which is prevented from rotation by the flattened face 13 on the bolt or threaded element. The end portion 28b of the spring ring terminates in an eye 29 by which the spring ring may be operated when being applied or removed.

The invention having been set forth, what is claimed is:

In a nut lock, a bolt having a threaded shank, a lock washer on the shank and means to prevent the washer from rotating relative to the shank, a nut engaged on the threaded end of the shank in contact with one face of the lock washer and provided with a radial flange, said radial flange and the margin of the lock washer having radial notches being unequal in number, so that when the nut is adjusted home against one face of the washer it is possible to insure registration of the notches, a spring band engaging about the peripheries of the washer and the flange of the nut, said spring band having separable ends with means formed on the ends cooperating with certain registering notches of the margin of the lock washer and the flange, one of said separable ends of the band being bent upon itself, and a portion beyond the bend being turned outwardly and laterally and provided with an opening for the reception of a tool for the purpose of removing the band, interengaging means for connecting the separable ends in certain of said registering notches, said band having a tongue diametrically opposite said separable ends for engaging over part of the flange at a point between certain of the notches of the flange, said tongue and the interengaging means of the separable ends acting to prevent axial sliding movement of the band.

In testimony whereof he affixes his signature.

GEORGE ELWERT.